W. F. WITHERINGTON.
Converting Motion for Churn-Power.
No. 212,527.  Patented Feb. 18, 1879.
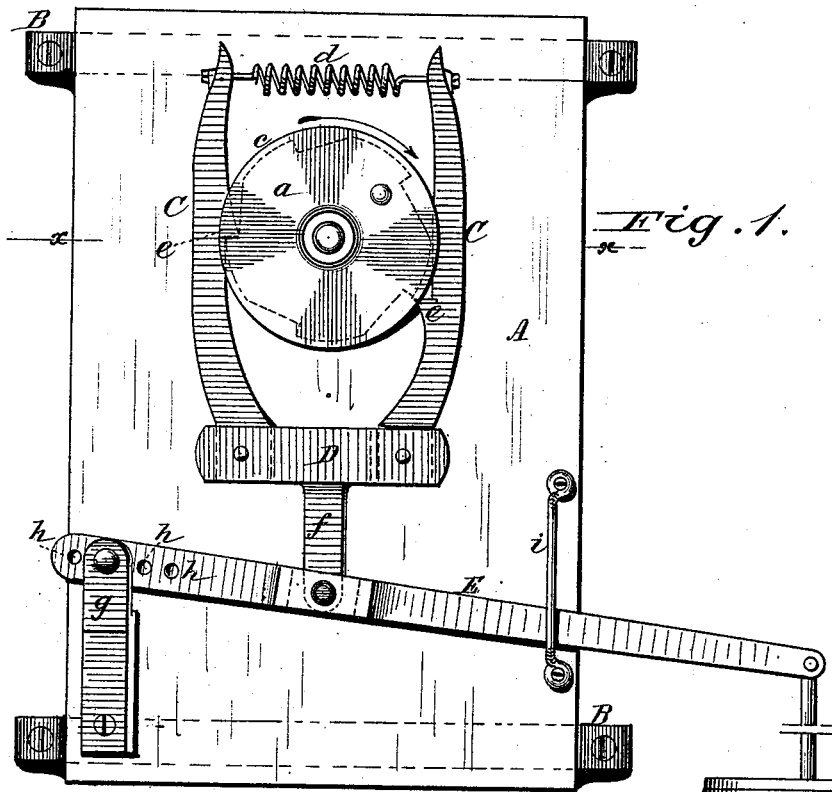
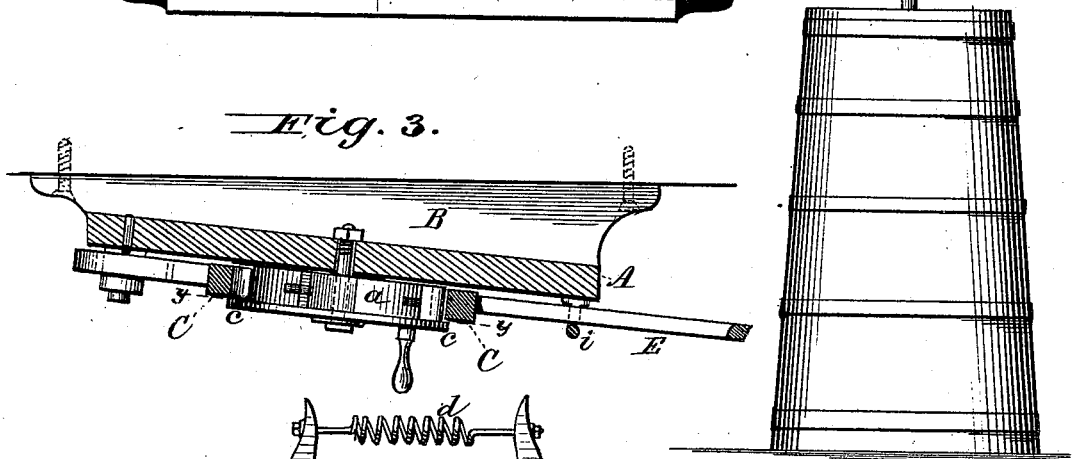
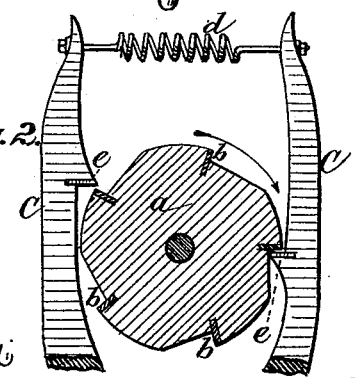
Attest:
H. L. Perrine
Floyd Norris
Willis F. Witherington
Inventor:
By Johnson & Johnson
Atty's

UNITED STATES PATENT OFFICE.

WILLIS F. WITHERINGTON, OF TRENTON, TENNESSEE, ASSIGNOR OF ONE-HALF HIS RIGHT TO JOHN ROBORD PATE, OF SAME PLACE.

IMPROVEMENT IN CONVERTING MOTIONS FOR CHURN-POWERS.

Specification forming part of Letters Patent No. 212,527, dated February 18, 1879; application filed December 18, 1878.

*To all whom it may concern:*

Be it known that I, WILLIS FRANKLIN WITHERINGTON, of Trenton, in the county of Gibson and State of Tennessee, have invented certain new and useful Improvements in Converting Motions for Churn-Powers, of which the following is a specification:

My improved motor is applicable to and designed for operating a reciprocating dasher of a churn by a rotary-acting device, consisting of a shouldered and face-flanged wheel, in connection with arms pivoted at their lower ends to a cross-head, and united at their upper ends by a spring, so as to adapt them by shoulders thereon to be acted upon by the shoulders of the wheel, to produce a reciprocating motion, during which the arms are maintained in position by a supporting-board or frame-work and the face-flange of the wheel. The cross-head is centrally connected to a horizontal vibrating lever, having an adjustable fulcrum-coupling at one end, and connecting the dasher-shaft at the other end. The spring holds the pivoted arms properly to the alternate action of the wheel-shoulders, and gives a very quick action to the dasher.

The device is designed to be fastened to the wall at a convenient height from the floor, so as to form a permanent appliance for use with any kind of a churn operating with a reciprocating dasher, and, by varying the stroke of the dasher, to churn any quantity of cream with comparatively little labor.

The churn is placed in position upon the floor, and the dasher-staff is connected for use with the motor-operating lever. When not in use the churn may be removed and kept clean, and the motor against the wall is out of the way.

Referring to the drawings, Figure 1 represents my improved motor for converting motion applied to a reciprocating churn-dasher; Fig. 2, a vertical section through the shouldered flanged wheel and the pivoted spring-united arms operated thereby, and Fig. 3 a cross-section of the same.

The operating device is mounted upon a board, A, about twenty-two inches long and twelve inches wide, fastened by cleats B to the wall or other convenient place by screws, so as to stand out obliquely, to give sufficient room to apply the churn to the operating-lever, as shown in Fig. 3. A crank-wheel, $a$, of suitable diameter, is mounted upon the board by a fixed axis-pin, and is provided with a number of radial shoulders, $b$, at equal distances apart, formed by circumferential recesses, and has an outer face-flange, $c$, similar to a car-wheel. Arms C are arranged to embrace the shouldered part of this wheel with a yielding capacity, being connected at their ends above the wheel by a spring, $d$, and pivoted at their ends below the wheel to a cross-head, D, and adapted by shoulders $e\ e$ to receive the alternate action of the shoulders of the wheel, to convert the rotary motion of the latter into a reciprocating movement of said arms. The shoulders of the pivoted yielding arms are arranged to receive the upward and downward action of the shoulders of the wheel as it revolves, and correspondingly move the arms.

The arrangement of the arm-shoulders in relation to the wheel-shoulders is such that the lifting action on one side of the wheel is released before the depressing action on the other side commences, and the reciprocating motion produced thereby is communicated to the dasher of a churn by means of a lever, E, pivoted to a central arm, $f$, of the cross-head, and to a pivoted link, $g$, which is capable of adjustment on the lever by holes $h$, toward or from the cross-head pivot, to vary the stroke of the dasher to suit the quantity of the cream to be churned. Adjusting the link $g$ toward the cross-head lengthens the stroke.

The flange of the wheel serves to hold the pivoted arms in working position against the supporting-board, and the spring serves to keep the arms drawn together and allow the wheel-shoulders to pass and catch upon the arm-shoulders in succession as the wheel is turned by the crank. Any suitable number of wheel-shoulders may be used; but I prefer five, as being suited to give a very rapid motion to the dasher. The shoulders of the wheel and of the pivoted arms are faced with steel, and the device is of simple construction and easy to operate.

The operating-lever is held in position by a long wire staple, $i$, which, in connection with the face-flange of the wheel, serves as guideways to hold the parts for work upon the wall-board.

The device may be mounted in a portable frame, if desired, and may be adapted for converting motion for any purpose for which it may be found useful.

I claim—

1. In a churn-power for converting rotary motion into reciprocating motion, the shouldered and face-flanged wheel $a\ b\ c$, in combination with the shouldered pivoted arms C C $e\ e$ and the operating-lever E, connected therewith and adapted for operation as described.

2. The shouldered arms C C, pivoted to the cross-head D below the wheel, and united above the wheel by a spring, $d$, in combination with the shouldered and face-flanged wheel, whereby said arms are held to the alternate action of the wheel-shoulders by a yielding capacity, to pass and catch upon the arm-shoulders in succession, as described.

3. The churn-motor consisting of the shouldered and face-flanged wheel, the pivoted shouldered arms C C, their uniting-spring $d$, the operating-lever E, its adjusting-link $g$, and guide $i$, all combined and mounted upon a supporting wall-board or frame, for the purpose described.

In testimony whereof I have hereunto set my hand in the presence of two witnesses.

WILLIS F. WITHERINGTON.

Witnesses:
  JESSE J. WELLS,
  H. L. RAINES.